(12) United States Patent
Bejerano et al.

(10) Patent No.: US 9,007,978 B2
(45) Date of Patent: Apr. 14, 2015

(54) METHOD AND APPARATUS FOR IMPROVED MULTICAST SERVICE

(75) Inventors: Yigal Bejerano, Springfield, NJ (US); Gabriela M. Abramovici, Berkeley Heights, IL (US); Katherine H. Guo, Scotch Plains, NJ (US); Tuvia Izsak, Livingston, NJ (US); Thyagarajan Nandagopal, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 501 days.

(21) Appl. No.: 12/962,362

(22) Filed: Dec. 7, 2010

(65) Prior Publication Data

US 2012/0140648 A1    Jun. 7, 2012

(51) Int. Cl.
*H04H 20/71* (2008.01)
*H04W 72/00* (2009.01)
*H04L 12/18* (2006.01)
*H04W 24/08* (2009.01)

(52) U.S. Cl.
CPC ......... *H04W 72/005* (2013.01); *H04L 12/1868* (2013.01); *H04L 12/189* (2013.01); *H04W 24/08* (2013.01)

(58) Field of Classification Search
None
See application file for complete search history.

(56) References Cited

U.S. PATENT DOCUMENTS

| 4,725,834 | A  | * | 2/1988  | Chang et al. ............... 370/451 |
|-----------|-----|---|---------|--------------------------------------|
| 5,050,163 | A  | * | 9/1991  | Van Bavel et al. .......... 370/233 |
| 5,940,769 | A  | * | 8/1999  | Nakajima et al. ............ 455/509 |
| 6,205,498 | B1 | * | 3/2001  | Habusha et al. ............... 710/29 |
| 6,269,085 | B1 | * | 7/2001  | Provino et al. ............. 370/256 |
| 6,317,881 | B1 | * | 11/2001 | Shah-Nazaroff et al. ...... 725/24 |
| 6,505,253 | B1 | * | 1/2003  | Chiu et al. .................... 709/235 |
| 6,718,159 | B1 | * | 4/2004  | Sato ............................. 455/11.1 |
| 6,993,352 | B2 | * | 1/2006  | Lundby ........................ 455/466 |
| 7,133,837 | B1 | * | 11/2006 | Barnes, Jr. ................. 705/26.81 |
| 7,203,497 | B2 | * | 4/2007  | Belcea ......................... 455/446 |
| 7,215,642 | B2 | * | 5/2007  | Uesugi et al. ................ 370/236 |
| 7,408,931 | B2 | * | 8/2008  | LoGalbo et al. ............. 370/390 |
| 7,561,599 | B2 | * | 7/2009  | Ekl et al. ...................... 370/507 |
| 7,668,128 | B1 | * | 2/2010  | Benveniste .................. 370/311 |
| 7,890,049 | B2 | * | 2/2011  | Chang et al. ................ 455/11.1 |
| 8,050,248 | B2 | * | 11/2011 | Meyer et al. ................. 370/349 |
| 8,209,574 | B2 | * | 6/2012  | Pendakur et al. ............ 714/748 |
| 8,229,351 | B2 | * | 7/2012  | Walke et al. ................ 455/13.1 |
| 8,254,300 | B1 | * | 8/2012  | Zhang et al. ................ 370/315 |
| 8,295,220 | B2 | * | 10/2012 | Zou et al. .................... 370/312 |
| 8,537,794 | B2 | * | 9/2013  | Hirano et al. ................ 370/338 |
| 8,654,697 | B2 | * | 2/2014  | Wu et al. ..................... 370/312 |
| 2002/0049068 | A1 | * | 4/2002 | Koo et al. .................... 455/522 |
| 2002/0114379 | A1 | * | 8/2002 | Uesugi et al. ................ 375/219 |
| 2002/0141454 | A1 | * | 10/2002 | Muniere ..................... 370/535 |
| 2002/0151300 | A1 | * | 10/2002 | Suda et al. ................... 455/422 |
| 2003/0012126 | A1 | * | 1/2003 | Sudo ........................... 370/203 |
| 2003/0031175 | A1 | * | 2/2003 | Hayashi et al. .............. 370/390 |
| 2004/0014467 | A1 | * | 1/2004 | O'Neill et al. ............. 455/422.1 |

(Continued)

*Primary Examiner* — Ian N Moore
*Assistant Examiner* — Dung B Huynh
(74) *Attorney, Agent, or Firm* — Harness, Dickey & Pierce (57) ABSTRACT

Various methods and devices are provided to address the need for improved multicast operation. In one method, a station transmits (401) a multicast packet to a plurality of mobile devices and to a group of monitoring stations (MSs). An indication of whether the multicast packet was received by that MS is received (402) from each monitoring station (MS) of the group of MSs. When this indication indicates that the multicast packet was not received, the multicast packet is retransmitted (403) to the plurality of mobile devices and to the group of MSs.

8 Claims, 4 Drawing Sheets

300

(56) References Cited

U.S. PATENT DOCUMENTS

| | | | |
|---|---|---|---|
| 2004/0066763 A1* | 4/2004 | Hashimoto et al. | 370/329 |
| 2004/0081152 A1* | 4/2004 | Thubert et al. | 370/392 |
| 2004/0184471 A1* | 9/2004 | Chuah et al. | 370/420 |
| 2004/0208152 A1* | 10/2004 | Perkins et al. | 370/338 |
| 2005/0157720 A1* | 7/2005 | Chandhok et al. | 370/390 |
| 2005/0220131 A1* | 10/2005 | Ginzburg et al. | 370/432 |
| 2006/0013128 A1* | 1/2006 | Connor et al. | 370/229 |
| 2006/0045056 A1* | 3/2006 | O'Hara, Jr. | 370/338 |
| 2006/0068825 A1* | 3/2006 | Iochi | 455/522 |
| 2006/0098592 A1* | 5/2006 | Proctor Jr. et al. | 370/315 |
| 2006/0215596 A1* | 9/2006 | Krishnaswamy et al. | 370/328 |
| 2006/0221825 A1* | 10/2006 | Okano | 370/229 |
| 2006/0291410 A1* | 12/2006 | Herrmann | 370/328 |
| 2007/0076739 A1* | 4/2007 | Manjeshwar et al. | 370/432 |
| 2007/0091889 A1* | 4/2007 | Xiao et al. | 370/390 |
| 2007/0133449 A1* | 6/2007 | Schacht et al. | 370/312 |
| 2007/0197161 A1* | 8/2007 | Walke et al. | 455/7 |
| 2007/0225044 A1* | 9/2007 | Law et al. | 455/562.1 |
| 2007/0245016 A1* | 10/2007 | Li et al. | 709/224 |
| 2007/0275657 A1* | 11/2007 | Chang et al. | 455/9 |
| 2008/0002691 A1* | 1/2008 | Qi et al. | 370/390 |
| 2008/0009320 A1* | 1/2008 | Rikkinen et al. | 455/560 |
| 2008/0031177 A1* | 2/2008 | Lee et al. | 370/312 |
| 2008/0082632 A1* | 4/2008 | Inagaki | 709/219 |
| 2008/0112350 A1* | 5/2008 | Nanda et al. | 370/312 |
| 2008/0123579 A1* | 5/2008 | Kozat et al. | 370/312 |
| 2008/0222478 A1* | 9/2008 | Tamaki | 714/749 |
| 2009/0040959 A1* | 2/2009 | Jung et al. | 370/312 |
| 2009/0170500 A1* | 7/2009 | Terabe et al. | 455/423 |
| 2009/0181666 A1* | 7/2009 | Viswanath | 455/425 |
| 2009/0268790 A1* | 10/2009 | Josiam et al. | 375/211 |
| 2009/0276540 A1* | 11/2009 | Ahn et al. | 709/243 |
| 2009/0307732 A1* | 12/2009 | Cohen et al. | 725/87 |
| 2010/0037270 A1* | 2/2010 | Bennett | 725/62 |
| 2010/0054137 A1* | 3/2010 | Deng et al. | 370/247 |
| 2010/0074158 A1* | 3/2010 | Ewing et al. | 370/312 |
| 2010/0118830 A1* | 5/2010 | Stephenson et al. | 370/331 |
| 2010/0153807 A1* | 6/2010 | Kakani | 714/749 |
| 2010/0202340 A1* | 8/2010 | Josiam et al. | 370/312 |
| 2010/0220608 A1* | 9/2010 | Skillermark et al. | 370/252 |
| 2010/0272009 A1* | 10/2010 | Cheng et al. | 370/315 |
| 2010/0315957 A1* | 12/2010 | Koo et al. | 370/246 |
| 2010/0322136 A1* | 12/2010 | Kanazawa et al. | 370/312 |
| 2011/0039545 A1* | 2/2011 | Ko et al. | 455/423 |
| 2011/0044218 A1* | 2/2011 | Kaur et al. | 370/310 |
| 2011/0064019 A1* | 3/2011 | Chun et al. | 370/315 |
| 2011/0096710 A1* | 4/2011 | Liu et al. | 370/312 |
| 2011/0271162 A1* | 11/2011 | Jitsukawa et al. | 714/751 |
| 2011/0305172 A1* | 12/2011 | Dean | 370/279 |
| 2012/0020271 A1* | 1/2012 | Josiam et al. | 370/312 |
| 2012/0117438 A1* | 5/2012 | Shaffer et al. | 714/749 |
| 2012/0163357 A1* | 6/2012 | Won et al. | 370/338 |
| 2012/0327760 A1* | 12/2012 | Du et al. | 370/216 |
| 2013/0242771 A1* | 9/2013 | Ohta et al. | 370/252 |

\* cited by examiner

METHOD AND APPARATUS FOR IMPROVED MULTICAST SERVICE

FIELD OF THE INVENTION

The present invention relates generally to communications and, in particular, to multicast service in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

In recent years IEEE 802.11-based wireless local area network (WLAN) technology, referred to as WiFi, has been rapidly deployed all over the world and the vast majority of mobile devices are WiFi enabled, including laptops, PDAs and smartphones. Recently it has been proposed by both academia and industry to use WiFi for video and content distribution. However, IEEE 802.11 lacks adequate support for multicast services, which hinders the use of IEEE 802.11 technology as a means for video distribution to a large number of mobile devices. More specifically, according to the specification of the IEEE 802.11 standard, broadcast/multicast frames are transmitted at a fixed and low bit rate due to the absence of a feedback mechanism such as ACK. This simple broadcasting technique with no feedback mechanism raises some technical issues such as:

a. High packet loss due to interference and a hidden node problem, which may significantly degrade the quality of the provided video stream.

b. Low network utilization due to transmission at low bit rate.

Thus, new solutions and techniques that are able to address one or more of the issues encountered when using WiFi for video and/or content distribution would meet a need and advance wireless communications generally.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods and devices are provided to address the need for improved multicast operation. In one method, a station transmits a multicast packet to a plurality of mobile devices and to a group of monitoring stations (MSs). An indication of whether the multicast packet was received by that MS is received from each monitoring station (MS) of the group of MSs. When this indication indicates that the multicast packet was not received, the multicast packet is retransmitted to the plurality of mobile devices and to the group of MSs. An article of manufacture is also provided, the article comprising a processor-readable storage medium storing one or more software programs which when executed by one or more processors performs the steps of this method.

Many embodiments are provided in which the method above is modified. For example, in many embodiments an indication of channel quality and/or a level of channel traffic observed by at least one MS of the group of MSs is received from the at least one MS. This indication may be used to determine a modulation scheme for transmitting multicast packets and/or to determine whether to retransmit a multicast packet. In many embodiments, the station transmits additional multicast packets to the plurality of mobile devices and to the group of MSs to produce a multicast sequence. Then, after transmitting the multicast sequence, an indication is received, from each MS of the group of MSs, of whether multicast packets in the multicast sequence were received by that MS. Depending on the embodiment, the station may transmit a marker between the end of the multicast sequence and the beginning of the next multicast sequence in a multicast flow, and/or the station may limit each multicast sequence to a maximum number of packets and a maximum duration, whichever is reached first. Also, depending on the embodiment, the station may utilize Point Coordination Function (PCF) mode to obtain feedback from each MS of the group of MSs after transmitting the multicast sequence, or it may send a Block-ACK-Req message to obtain feedback via Block-ACK messages from each MS of the group of MSs. In some embodiments, the station may include the functionality of a IEEE 802.11-based wireless local area network (WLAN) access point (AP). In some embodiments, each MS from the group of MSs is a pre-deployed, fixed transceiver device.

In another method, a monitoring station (MS) attempts to receive multicast packets in a multicast sequence of a multicast flow from a station. Upon detecting the end of the multicast sequence, the MS indicates to the station which multicast packets were received. An article of manufacture is also provided, the article comprising a processor-readable storage medium storing one or more software programs which when executed by one or more processors performs the steps of this method.

Many embodiments are provided in which this method is modified. For example, in many embodiments the MS comprises a pre-deployed, fixed transceiver device. In many embodiments, the MS also indicates a channel quality and/or a level of channel traffic that it observes. In some embodiments, the MS receives messaging from the station requesting the MS to send feedback for the multicast sequence. Depending on the embodiment, indicating to the station which multicast packets were received may include assigning a high priority to signaling conveying the indication of which multicast packets were received.

A transceiver node apparatus is also provided. The transceiver node being configured to communicate with other devices of a system and being operative to transmit a multicast packet to a plurality of mobile devices and to a group of monitoring stations (MSs) and to receive from each monitoring station (MS) of the group of MSs an indication of whether the multicast packet was received by each MS. When the indication received from at least one MS of the group of MSs indicates that the multicast packet was not received, the transceiver node is operative to retransmit the multicast packet to the plurality of mobile devices and to the group of MSs. Many embodiments are provided in which this transceiver node is modified. Examples of such embodiments can be found described above with respect to the first method.

A fixed monitoring station (MS) apparatus is also provided. The MS being configured to communicate with other devices of a system and being operative to attempt to receive multicast packets in a multicast sequence of a multicast flow from a station. Upon detecting the end of the multicast sequence, the MS is operative to indicate to the station which multicast packets were received. Many embodiments are provided in which this MS is modified. Examples of such embodiments can be found described above with respect to the second method.

DETAILED DESCRIPTION OF EMBODIMENTS

Figure 1:
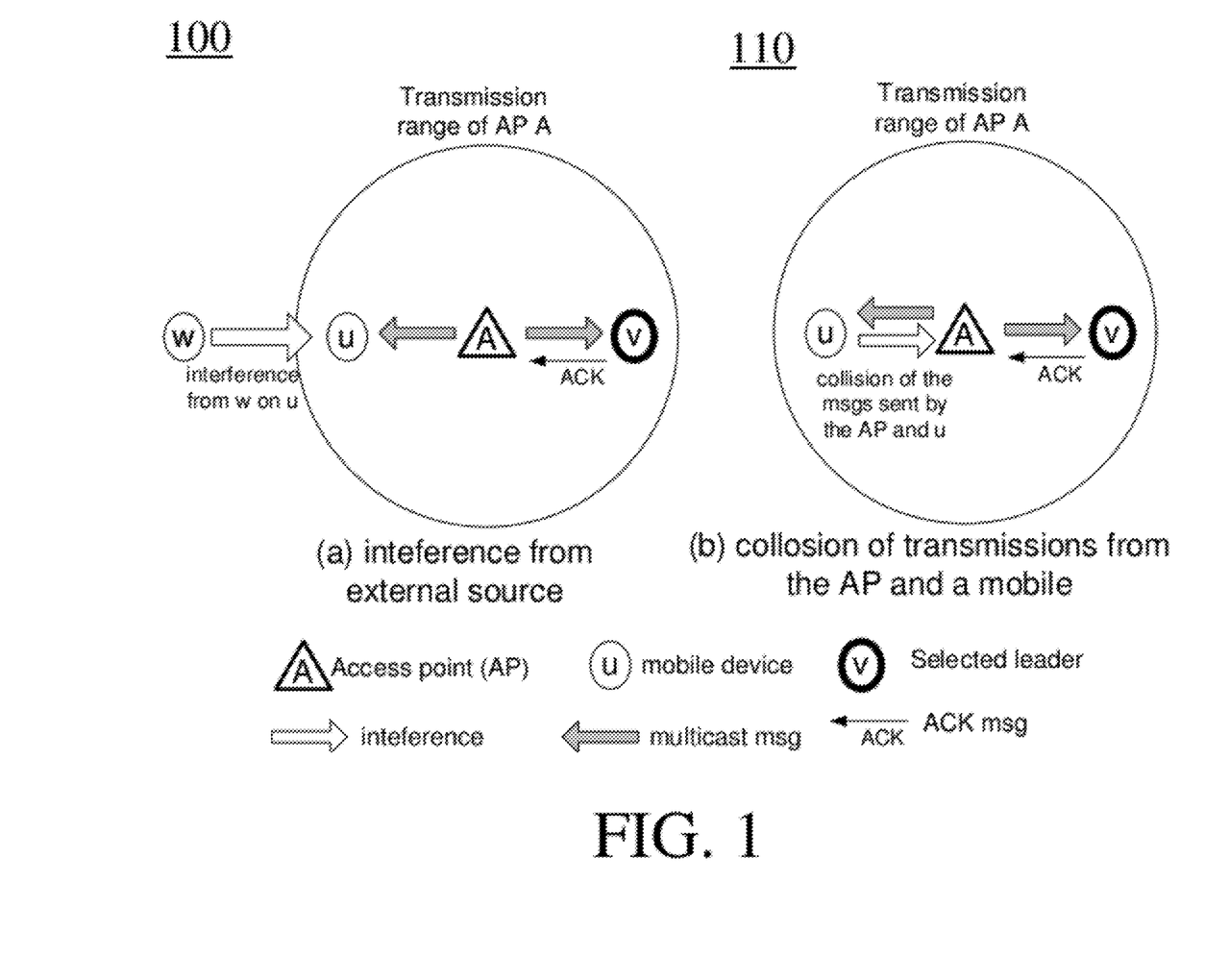
FIG. 1 is a block diagram depiction of two example scenarios in which a leader-based protocol (LBP) fails to detect multicast packets not being received by a multicast receiver.
Figure 2:
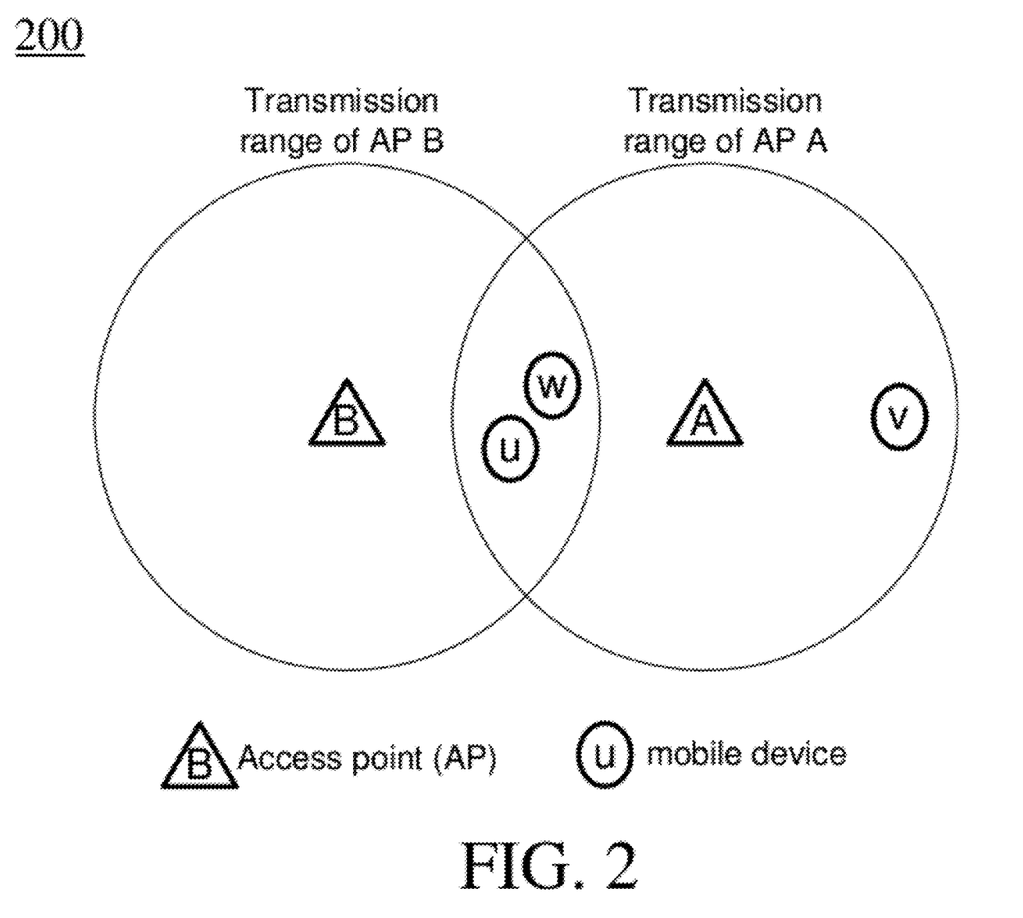
FIG. 2 is a block diagram depiction of an example scenario in which a leader-based protocol (LBP) fails to detect multicast packets not being received by multicast receivers due to interference from an adjacent AP.
Figure 3:
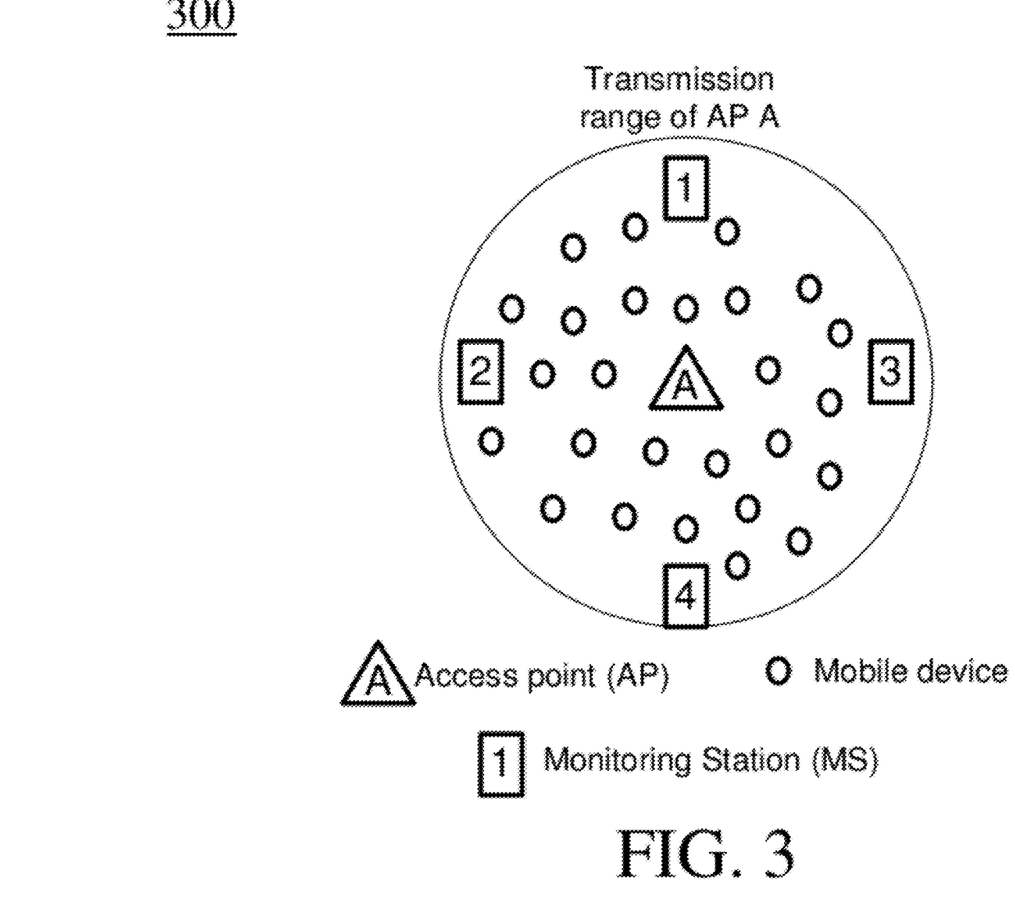
FIG. 3 is a block diagram depicting an AP with mobile devices and Monitoring Stations (MSs) in accordance with various embodiments of the present invention.

To provide a greater degree of detail in making and using various aspects of the present invention, a description of our approach to interference mitigation for WiFi multicast and a description of certain, quite specific, embodiments follows for the sake of example. FIGS. 1-3 are referenced in an attempt to illustrate some examples of specific interference problems and specific embodiments of the present invention.

At present, there are several proposals for overcoming the known shortages of WiFi multicast services. These proposals typically require changes to the standards and/or require support from the mobile devices themselves.

In IEEE 802.11 WLANs, multicasting is specified as a simple broadcasting mechanism that does not make use of ACK frames. According to the IEEE 802.11 standards, all frames with multicast and broadcast addresses should be transmitted at one of the rates included in the basic rate set. Several studies on multicasting in IEEE 802.11 WLANs have focused on improving transmission reliability. The most common approach is based on integrating automatic repeat request (ARQ) mechanisms into the protocol architecture. The main challenge of this approach is generating the appropriate acknowledgement messages as well as minimizing the number of retransmissions of each multicast message.

The work of Kuri and Kasera [KK01] proposes a leader-based protocol (LBP) ARQ mechanism. LBP elects one of the multicast group receivers as the leader and allows the leader receiver to send acknowledgement (ACK) and the non-leader receivers to send negative acknowledgement (NACK). After transmission of a multicast message, the leader receiver sends an ACK in reply if the data is received correctly, or does nothing otherwise. If any non-leader receiver detects a transmission error, it sends a NACK. The NACK frame collides with the ACK, if sent by the leader receiver. When the access point (AP) receives an ACK, it considers the transmission as successful. Otherwise, the AP repeats the whole procedure and retransmits the data until a retransmission limit is reached. LBP suffers from three main problems:

(a) If the entire data frame is lost, the non-leader receivers can not reply with NACKs. Thus, in practice LBP is not reliable for non-leader receivers.

(b) LBP suffers from poor performance when the channel error rates are high. Notice that the non-leader receivers send NACKs whenever the received frame is in error, regardless of whether this erroneous frame has been received correctly before or not. Thus in case of a NACK, the AP has to retransmit the message again until all receivers receive the data frame correctly during the same transmission.

(c) The LBP does not provide statistics of the channel condition experienced by the mobiles. Therefore, the AP does not adapt the multicast PHY rate to the state of receivers. This may cause inefficient resource usage of the Wi-Fi channel.

Addressing these issues with the LBP mechanism, Li and Herfet propose two improved schemes to the LBP proposal in [LH28:BLBP] and [LH28:HLBP]. In the Beacon-driven Leader-based Protocol (BLBP) [LH28:BLBP], a beacon frame is sent before any multicast message. The Beacon message contains the sequence number of the multicast message as well as a timer for sensing NACK messages. This information enables each non-leader receiver to check if it has already received the transmitted multicast message. Furthermore, it provides the receiver a time window for sending a NACK message. In [LH28:BLBP] the authors combine BLBP and packet level FEC and propose a Hybrid Leader Based Protocol (HLBP) for the MAC layer multicast error control. HLBP uses block erasure codes for dealing with poor channel conditions.

Gupta et al. [GSL03] present a reliable multicast MAC protocol, termed the 802.11MX protocol. The 802.11 MX uses an ARQ mechanism supplemented by a busy tone signal. When a mobile associated with a multicast group receives a corrupted packet, it sends an NACK tone instead of actually transmitting an NACK frame. Upon detecting the NACK tone, the sender will retransmit the data packet. On the contrary, if the AP does not detect the NACK tone, the AP assumes that the transmission of the multicast packet has been successfully completed. Since the 802.11MX mechanism does not need a leader to operate, it performs better than the LBP protocol in terms of both data throughput and reliability. However, this mechanism requires significant changes to the 802.11 standard. In particular, it assumes the availability of an out-of-band signaling channel for each AP in order for the multicast receivers to transmit the NACK tone.

The studies in [SC03], [BSS06] and [VCOST07] present rate adaptation mechanisms for multicast transmissions with the aim of improving the channel utilization. Seok and Choi [SC03] present the necessity of a multicast rate adaptation mechanism for WLANs. They present a multicast rate selection algorithm based on the traffic load of the WLAN and the channel condition of the multicast receivers. If the WLAN is congested, the multicast is set to use a higher PHY rate than the data rates in the basic service set (BSS) basic rate set parameter for mitigating the congestion. Otherwise, the multicast rate is adjusted according to the worst channel condition among channel conditions of all multicast receivers. However, this mechanism assumes that the AP knows the channel condition of each multicast receiver. In [BSS06] the authors introduced the rate adaptation and reliable multicast delivery scheme. In this scheme the transmitter first sends an RTS frame to indicate the beginning of a multicast transmission. The RTS frame is used by all the multicast receivers to measure the receiver signal strength. Then, each multicast receiver sends a variable length CTS frame whose length is inversely proportional to the experienced channel quality. Thus, receivers with low channel quality will send long CTS frames. Note that the CTS frames will collide. However, the AP can sense the duration of the longest CTS frame and use this duration for adjusting the transmission bit rate of the multicast frame. The authors of [VCOST07] propose a cross-layer auto rate selection multicast mechanism for multi-rate wireless LANs, called ARSM. This scheme can be viewed as a variant of the LBP when each mobile device in the multicast group evaluates its channel condition from the AP by getting the RSSI (received signal strength indication) information from its PHY layer. Then the mobile that suffers from the lowest RSSI is selected as the group leader. The AP uses the RSSI information from the leader for selecting the desired bit-rate of multicast transmissions.

Independent of the above mentioned work on the generation of an appropriate number of acknowledgement messages and minimizing the number of retransmissions for multicast, there is a different area of work of utilizing unicast flows to transmit multicast flows. Several studies propose to map each multicast flow to a few unicast flows. For instance, the DirCast [VCOST07] scheme converts multicast packets to unicast packets targeted to certain selected multicast receivers. Other receivers receive these packets by listening in promiscuous mode. The target receivers are carefully selected to minimize loss rate experienced by the non-targeted receivers. If necessary, mobiles are forced to change the AP they are associated with. In addition, DirCast uses proactive adaptive FEC to further reduce the loss rate and implements a novel virtual multicast interface in order to be compatible with the security needs of the enterprise.

In industry, several IEEE 802.11 equipment vendors as Cisco [Cisco] Aruba [Aruba] and several others solve the drawbacks of the Wi-Fi multicast services by converting each multicast packet into several unicast packets, at the medium access control (MAC) layer and sending individual unicast packets to each one of the receivers. Currently, a new IEEE 802.11 standard is in progress, termed IEEE 802.11aa [802.11aa]. The goal of this draft is to standardize MAC layer enhancements for more reliable multicast transmission of real-time multimedia streams over wireless LANs. This extended reliability is provided via retransmission mechanism (ARQ), which is referred to as "More Reliable Groupcast" (MRG). In MRG, the group membership of every multicast flow is known (e.g., by using Internet Group Management Protocol (IGMP) snooping). After the transmission of one or several multicast packets the sender (typically the AP) invokes a Groupcast Block-ACK polling process. In such process, each receiver individually provides a bit map of previously correctly received multicast packets. Using this information the sender determines the packets that should be retransmitted, which are sent again to the entire group.

Notice that all of the above schemes suffer from one or both of the following weaknesses. Some of them (IEEE-802.11aa and DirCast) cannot scale to deal with a large number of mobile users. Others can be viewed as variation of leader-based protocol (LBP) which may not detect many lost packets in noisy environments or as a result of the hidden node problem. FIG. 1 illustrates some issues with the LBP-based approaches. FIG. 1 depicts two scenarios 100 and 110 in which multicast packets have been correctly received by the leader and acknowledged. Yet in both cases not all the multicast receivers were able to correctly decode the transmitted multicast packets and some receivers are not able to send NACK packets to the AP. These examples each consider a single AP A with two mobiles in the multicast group denoted by nodes U and V. In both cases node V is the selected leader by LBP and we can assume that the channel quality of U and V is similar. In scenario 100 a packet sent by node W interferes with multicast packet sent by AP A at node U, therefore node U is not able to decode the multicast transmission. However, node V can decode the packet and sends an ACK. In scenario 110 the multicast packet sent by the AP A collides with a transmission of node U. Thus, node V can decode the multicast packet and send an ACK although node U did not receive the multicast packet.

Now we consider an IEEE 802.11 wireless LAN (WiFi) with a single or several adjacent access points (APs) that use the same wireless channels. Moreover, we assume this to be a crowded area with a dense mobile population. In such settings, a station transmission may interfere with other transmissions at adjacent AP cells. This situation is in particular aggravated in the case of multicast messages since some of the receivers may correctly receive a transmitted packet while others cannot. For instance, in scenario 200 of FIG. 2, if both APs A and B transmit at the same time, mobile U and W may not decode any of the transmissions (due to collision) but mobile V will be able to decode the packet send by AP A. This is an example of a hidden node problem.

We make the observation that adjacent receivers generally suffer from similar interferences and so there is a correlation between their ability to decode packets. For instance, in FIG. 2, mobile U and W are adjacent to each other, thus if mobile U can decode a multicast packet sent by AP A, then with a high probability mobile W can also decode the packet. We use this observation to suggest a solution that leverages these correlations. More specifically, we propose to deploy near the boundary of a cell of a given AP several static stations, referred to as Monitoring Stations (MSs) that listen to the multicast transmissions of the AP.

After sending one or more multicast messages, the AP receives from the MSs acknowledgement signaling as feedback on whether the multicast packets have been correctly received. Based on this feedback, the AP can decide which messages it should retransmit. In other words, when the AP receives a confirmation about a correct reception of a multicast packet by all the MSs (not necessarily for the same specific transmission or retransmission of the packet) then the packet is considered as correctly received. In addition, the MSs can update the AP about the channel quality that they each experience as well as the amount of WiFi activity in their vicinity. This information is useful for determining a desired modulation scheme for transmitting the multicast packets for efficient utilization of the wireless resources.

A noticeable advantage of this approach is that the retransmission and rate-adaptation mechanisms do not need to depend on any feedback from mobile nodes. Thus, there is no need to change the functionality of the mobile devices. In practice, the MSs may be dedicated devices or other APs that utilize the same wireless channels as the AP or APs for which they provide feedback.

We consider a WiFi network with numerous mobile devices that are listening to a given multicast flow as described above. Moreover, for evaluating the correct reception of multicast packets we assume that the WLAN contains Monitoring Stations (MSs) that are located at the edges of the transmission range of each AP. For instance, diagram 300 of FIG. 3 illustrates an AP A that transmits a multicast flow to a large number of mobile devices. AP A is surrounded by four MSs 1-4 which inform the AP about the correct reception of the multicast packets at the edge of its cell.

At the application level, we divide a multicast flow into multiple sequences, where each sequence consists of multiple consecutive multicast packets from the same flow. Instead of sending ACK or NACK regarding each packet in the multicast flow, each Monitoring Station (MS) is designed to send an aggregate ACK for each sequence of packets.

There are a number of approaches to separate a multicast flow into a number of sequences. One approach is to insert a marker packet periodically that signifies the boundary of two adjacent sequences. The period to insert a marker packet by default is every N packets. However the AP also sets a timer, M_timer, at the beginning of each sequence. When the timer M_timer expires, but less than N packets have been transmitted by the AP since the last marker packet is inserted to the multicast flow and transmitted, the AP inserts another marker packet. As a result, the multicast flow is transformed into sequences of packets marked by marker packets. The number of packets in each sequence is at most N, and the transmission time difference between two boundary marker packets for each sequence is at most M_timer.

Another approach is to insert a Seq_Begin packet to the beginning of the sequence and insert a Seq_End packet to the end of the sequence. The number of packets in a sequence is at most N, and M_timer is used as in the previous approach to limit the duration of a sequence to be at most M_timer.

At the end of the sequence, the monitoring stations (MSs) indicate to the transmitting AP which packets were received correctly as well as the quality of the wireless channel. Moreover, the MSs may send to the AP additional information such as the traffic load on the channel, etc. The AP collects feedback from all the MSs and a packet that has been correctly received by all the MSs (although not necessarily via the same transmission) is considered as correctly received by all the mobiles in the AP cell. A packet that has not been acknowledge by some or all of the MSs is considered an undelivered packet and the AP may retransmit this packet based on the load on the WLAN and the required bit-rate for sending the packet.

One important aspect of the proposed scheme is ensuring that the AP gets all of the MSs' feedback about correctly received packets in a timely manner. This is not trivial to accomplish since the commonly used DCF (Distributed Coordinate Function) mode of the IEEE 802.11 standard does not provide a bound on the delay of a message. Below we propose three possible solutions for enabling the MSs to send their feedback to the AP within a short time interval.

1. Using the priority mechanism provided by the IEEE 802.11-e standard [IEEE-802.11e]—IEEE 802.11-e enhances the standard with a priority mechanism. This mechanism enables senders to give different priorities to their packets and as a result packets with higher priority suffer from lower delay than packets with lower priority. The MSs may give their feedback messages high priority in order to deliver their feedback to the AP quickly.

2. Using the PCF (Point Coordination Function) mode—The PCF mode enables the AP to control the activity on the wireless channel and to grant transmission to devices in its cell. Unfortunately, many mobile devices don't support the PCF mode. Since the MSs are dedicated devices designed for providing feedback after multicast transmission, these devices can be designed to support the PCF mode. The PCF mode can enable the multicast AP to collect the MSs' feedback after transmitting a sequence of multicast packets.

3. Using the Block-ACK mechanism introduced in IEEE 802.11-aa [802.11aa]—Currently the IEEE 802.11 standards committee is working on a new standard, referred to 802.11-aa. This standard enables the AP to query a set of receivers as to whether they received a message. After sending a multicast message, the AP sends an individual Block-ACK-Req message to each one of the receivers. Each receiver replies with a Block-ACK message. The same mechanism may also be used by our scheme for getting feedback from the MSs.

The proposed approach provides a scalable solution for providing quasi-reliable multicast services. While correct reception of every multicast message by every receiver that listens to the multicast group is not guaranteed, this approach statistically detects most instances of incorrect reception of multicast messages. Moreover, the approach enables rate-adaption of the multicast messages for more efficient utilization of the wireless channel.

Other solutions either cannot scale to support multicast flow to a large number of mobile devices (e.g., unicast-based solutions or solutions based on Block-ACK) or they have issues detecting collisions (e.g., Leader-Based Protocol solutions) such as illustrated in FIG. 1 and described above. Our approach detects the vast majority of the collisions or incorrect reception of multicast messages while using a limited number of monitoring station (MSs) that send feedbacks to the AP.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Figure 4:
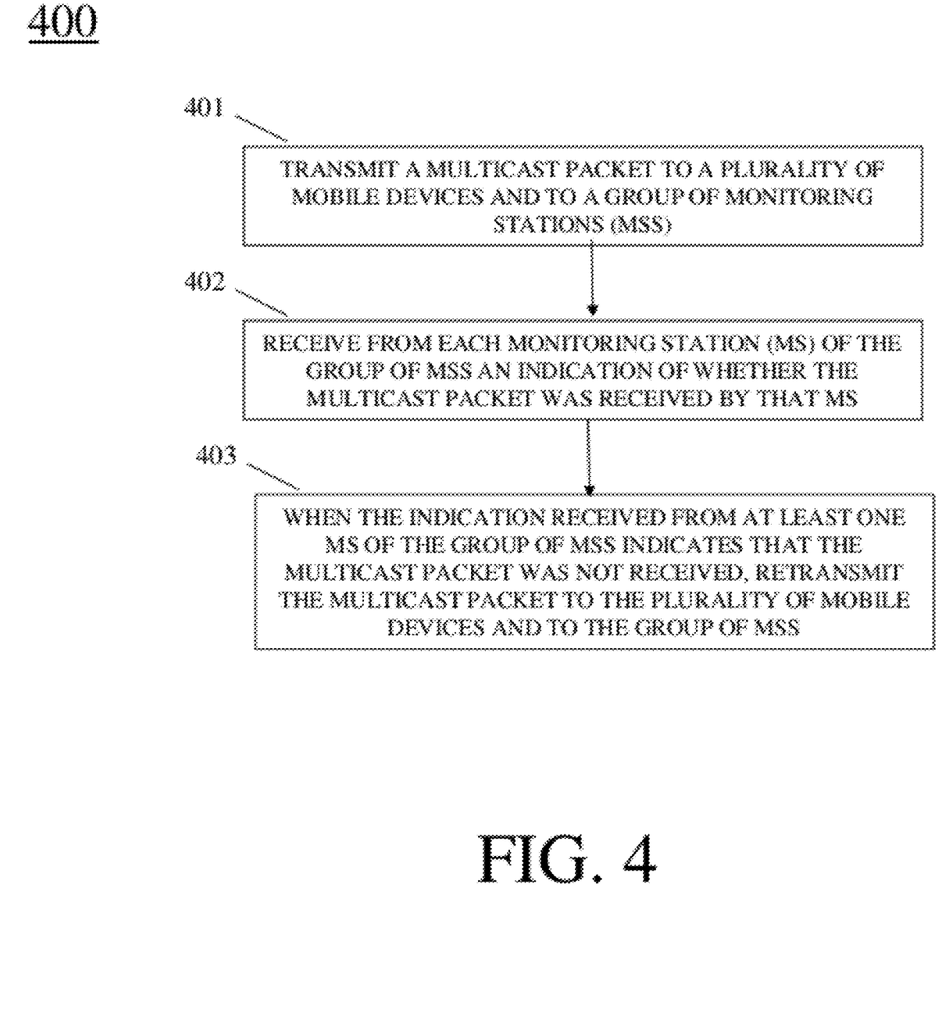
FIG. 4 is a logic flow diagram of functionality performed by a station in accordance with various embodiments of the present invention.

Aspects of embodiments of the present invention can be understood with reference to FIG. 4. Diagram 400 of FIG. 4 is a logic flow diagram of functionality performed by a station in accordance with various embodiments of the present invention. In the method depicted in diagram 400, a station transmits (401) a multicast packet to a plurality of mobile devices and to a group of monitoring stations (MSs). An indication of whether the multicast packet was received by that MS is received (402) from each monitoring station (MS) of the group of MSs. When this indication indicates that the multicast packet was not received, the multicast packet is retransmitted (403) to the plurality of mobile devices and to the group of MSs.

Many embodiments are provided herein in which the method and logic flow above may be modified. For example, in many embodiments an indication of channel quality and/or a level of channel traffic observed by at least one MS of the group of MSs is also received from the at least one MS. This indication may be used by the station to determine a modulation scheme for transmitting multicast packets and/or to determine whether to retransmit a multicast packet (such as in 403).

In many embodiments, the station transmits additional multicast packets (in addition to that in 401) to the plurality of mobile devices and to the group of MSs to produce a multicast sequence. Then, after transmitting the multicast sequence, an indication is received, from each MS of the group of MSs, of whether multicast packets in the multicast sequence were received by that MS (similar to 402, only an aggregate indication is received). Depending on the embodiment, the station may transmit a marker between the end of the multicast sequence and the beginning of the next multicast sequence in a multicast flow, and/or the station may limit each multicast sequence to a maximum number of packets and a maximum duration, whichever is reached first. Also, depending on the embodiment, the station may utilize Point Coordination Function (PCF) mode to obtain feedback from each MS of the group of MSs after transmitting the multicast sequence, or it may send a Block-ACK-Req message to obtain feedback via Block-ACK messages from each MS of the group of MSs.

In some embodiments, the station may be a IEEE 802.11-based wireless local area network (WLAN) access point (AP) that additionally performs the functionality described above with respect to FIG. 4. Also, the MSs may be pre-deployed, fixed transceiver devices, such as much simplified access points or perhaps adjacent access points.

Below is a list of references that are referred to throughout the present specification:

[KK01] Kuri, J., and Kasera, S. K.: 'Reliable multicast in multi-access wireless LANs', ACM Wirel. Netw., 2001, 7, (4), pp. 359-369.

[LH28:BLBP] Zhao Li; Herfet, T.; "BLBP: A Beacon-Driven Leader Based Protocol for MAC Layer Multicast Error Control in Wireless LANs," Wireless Communications, Networking and Mobile Computing, 2008. WiCOM '08. 4th International Conference on 12-14 Oct. 2008, pp. 1-4.

[LH28:HLBP] Zhao Li; Herfet, T.; "HLBP: A Hybrid Leader Based Protocol for MAC Layer Multicast Error Control in Wireless LANs," Global Telecommunications Conference, 2008. IEEE GLOBECOM 2008. IEEE, vol., no., pp. 1-6, Nov. 30, 2008-Dec. 4, 2008.

[GSL03] Gupta, S. K. S., Shankar, V., and Lalwani, S.: 'Reliable multicast MAC protocol for wireless LANs'. IEEE ICC, Anchorage, USA, May 2003, pp. 93-97.

[SC03] Seok, Y., and Choi, Y.: 'Efficient multicast supporting in multi-rate wireless local area networks', Lecture notes Comput. Sci., 2003, 2662, pp. 273-283.

[BSS06] Basalamah, A., Sugimoto, H., and Sato, T.: 'Rate adaptive reliable multicast MAC protocol for WLANs'. Proc. VTC, Melbourne, Australia, May 2006, pp. 1216-1220.

[VCOST07] Villalon, J.; Cuenca, P.; Orozco-Barbosa, L.; Seok, Y.; Turletti, T.; "ARSM: a cross-layer auto rate selection multicast mechanism for multi-rate wireless LANs," Communications, IET, vol. 1, no. 5, pp. 893-902, October 2007.

[CKM+09] Chandra, R.; Karanth, S.; Moscibroda, T.; Navda, V.; Padhye, J.; Ramjee, R.; Ravindranath, L.; "DirCast: A practical and efficient Wi-Fi multicast system," Network Protocols, 2009. ICNP 2009. 17th IEEE International Conference on, vol., no., pp. 161-170, 13-16 Oct. 2009.

[Cisco] Cisco, White-paper, Optimizing Enterprise Video Over Wireless LAN, 2010.

[Aruba] Aruba Video Quick Reference & Design Guide, Aruba networks, http://www.arubanetworks.com/pdf/technology/DG_Video-Reference-and-Design-Guide.pdf.

[802.11aa] IEEE 802.11aa draft—Robust Audio Video Transport Streaming.

[802.11e] Medium Access Control (MAC) Enhancements for Quality of Service (QoS), IEEE Amendment 8: 802.11e, June 2005.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method for improved multicast transmission service, the method comprising:

transmitting by a station a multicast packet to a plurality of mobile devices and to a group of monitoring stations in a coverage area, the monitoring stations being fixed access points positioned at edges of the coverage area;

receiving from each monitoring station of the group of monitoring stations an indication of whether the multicast packet was received by that monitoring station;

determining whether to retransmit the multicast packet to the plurality of mobile devices and to the group of monitoring stations based on the indication of whether the multicast packet was received, but independent of feedback from each of the plurality of mobile devices; and retransmitting the multicast packet to the plurality of mobile devices and to the group of monitoring stations when the indication received from at least one monitoring station of the group of monitoring stations indicates that the multicast packet was not received;

transmitting by the station additional multicast packets to the plurality of mobile devices and to the group of monitoring stations to produce a multicast sequence;

after transmitting the multicast sequence, receiving from each monitoring station of the group of monitoring stations an indication of whether multicast packets in the multicast sequence were received by each monitoring station;

utilizing Point Coordination Function (PCF) mode to obtain feedback from each monitoring station of the group of monitoring stations after transmitting the multicast sequence;

receiving from at least one monitoring station of the group of monitoring stations an indication of at least one of channel quality and a level of channel traffic observed by the at least one monitoring station; and utilizing the indication of at least one of channel quality and a level of channel traffic to determine a modulation scheme for transmitting multicast packets.

2. The method of claim 1, further comprising:
utilizing the indication of at least one of the channel quality and the level of channel traffic to determine whether to retransmit the multicast packet.

3. The method of claim 1, further comprising:
transmitting by the monitoring station a marker between the end of the multicast sequence and the beginning of the next multicast sequence in a multicast flow.

4. The method of claim 1, further comprising:
limiting each multicast sequence to a maximum number of packets and a maximum duration, whichever is reached first.

5. The method of claim 1, further comprising:
sending a Block-ACK-Req message to obtain feedback via Block-ACK messages from each monitoring station of the group of monitoring stations.

6. The method of claim 1, wherein each monitoring station from the group of monitoring stations comprises a pre-deployed, fixed transceiver device.

7. An article of manufacture comprising a non-transitory processor-readable storage medium storing one or more software programs which when executed by one or more processors performs a method comprising:

transmitting by a station a multicast packet to a plurality of mobile devices and to a group of monitoring stations in a coverage area, the monitoring stations being fixed access points positioned at edges of the coverage area;

receiving from each monitoring station of the group of monitoring stations an indication of whether the multicast packet was received by that monitoring station;

determining whether to retransmit the multicast packet to the plurality of mobile devices and to the group of monitoring stations based on the indication of whether the multicast packet was received, but independent of feedback from each of the plurality of mobile devices;

retransmitting the multicast packet to the plurality of mobile devices and to the group of monitoring stations when the indication received from at least one monitoring station of the group of monitoring stations indicates that the multicast packet was not received;

transmitting by the station additional multicast packets to the plurality of mobile devices and to the group of monitoring stations to produce a multicast sequence;

after transmitting the multicast sequence, receiving from each monitoring station of the group of monitoring stations an indication of whether multicast packets in the multicast sequence were received by each monitoring station;

utilizing Point Coordination Function (PCF) mode to obtain feedback from each monitoring station of the group of monitoring stations after transmitting the multicast sequence;

receiving from at least one monitoring station of the group of monitoring stations an indication of at least one of channel quality and a level of channel traffic observed by the at least one monitoring station; and utilizing the indication of at least one of channel quality and a level of channel traffic to determine a modulation scheme for transmitting multicast packets.

8. A transceiver node of a communication system, the transceiver node being configured to communicate with other devices in the system, the transceiver node comprising:

a transceiver configured to,
  transmit a multicast packet to a plurality of mobile devices and to a group of monitoring stations in a coverage area, the monitoring stations being fixed access points positioned at edges of the coverage area,
  receive, from each monitoring station of the group of monitoring stations, an indication of whether the multicast packet was received by the monitoring station, and
  receive from at least one monitoring station of the group of monitoring stations an indication of at least one of channel quality and a level of channel traffic observed by the at least one monitoring station; and a processor configured to,
  determine whether to retransmit the multicast packet to the plurality of mobile devices and to the group of monitoring stations based on the indication of whether the multicast packet was received, but independent of feedback from each of the plurality of mobile devices, and
  utilize the indication of at least one of channel quality and a level of channel traffic to determine a modulation scheme for transmitting multicast packets; and wherein the transceiver is further configured to,
  retransmit the multicast packet to the plurality of mobile devices and to the group of monitoring stations when the indication received from at least one monitoring station of the group of monitoring stations indicates that the multicast packet was not received,
  transmit additional multicast packets to the plurality of mobile devices and to the group of monitoring stations to produce a multicast sequence,
  after transmitting the multicast sequence, receive from each monitoring station of the group of monitoring stations an indication of whether multicast packets in the multicast sequence were received by each monitoring station, and
  utilize Point Coordination Function (PCF) mode to obtain feedback from each monitoring station of the group of monitoring stations after transmitting the multicast sequence.

* * * * *